United States Patent [19]
Crowther

[11] 3,844,886
[45] Oct. 29, 1974

[54] NUCLEAR REACTOR UTILIZING PLUTONIUM IN PERIPHERAL FUEL ASSEMBLIES

[75] Inventor: Russell L. Crowther, Saratoga, Calif.

[73] Assignee: General Electric Company, San Jose, Calif.

[22] Filed: Apr. 16, 1971

[21] Appl. No.: 134,845

Related U.S. Application Data

[63] Continuation of Ser. No. 726,079, May 2, 1968, abandoned.

[52] U.S. Cl. ................. 176/44, 176/17, 176/54
[51] Int. Cl. ............................................. G21c 1/00
[58] Field of Search ............... 176/17, 18, 40, 54, 44

[56] References Cited
UNITED STATES PATENTS

| | | |
|---|---|---|
| 3,147,191 | 9/1964 | Crowther .......................... 176/68 |
| 3,211,621 | 10/1965 | Creagan ............................ 176/18 |
| 3,382,153 | 5/1968 | Bigge et al. ...................... 176/40 |
| 3,432,389 | 3/1969 | Stern ................................. 176/40 |

OTHER PUBLICATIONS

Power Reactor Technology, Vol. 8, No. 4, pp. 211–213, (an article by Plumlee), 1965 (Fall)

*Primary Examiner*—Reuben Epstein
*Attorney, Agent, or Firm*—Ivor J. James, Jr.; Samuel E. Turner; Sam E. Laub

[57] ABSTRACT

A nuclear reactor core for effectively utilizing plutonium fuel. The plutonium fuel is placed in the fuel assemblies at the periphery of the core, in the low energy neutron spectrum region, to take advantage of the characteristics of the plutonium fuel and to optimize the use of the peripheral portion of the core.

12 Claims, 11 Drawing Figures

PATENTED OCT 29 1974

3,844,886

INVENTOR:
RUSSELL L. CROWTHER

BY: *Samuel E. Turner*

ATTORNEY

NUCLEAR REACTOR UTILIZING PLUTONIUM IN PERIPHERAL FUEL ASSEMBLIES

This application is a continuation of application Ser. No. 726,079, filed 2 May 1968, now abandoned.

The release of large amounts of energy through nuclear fission reactions is now well known. In general, a fissile (fissionable) atom such as U-233, U-235, Pu-239, or Pu-241 absorbs a neutron in its nucleus and undergoes a nuclear disintegration or fission. This produces, on the average, two fission products of lower atomic weight with great kinetic energy and also several fission neutrons of high energy.

The kinetic energy of the fission products is dissipated as heat in the fuel elements of the reactor. If there is at least one net neutron remaining on the average from each fission event and this neutron induces a subsequent fission event, the fission reaction becomes self-sustaining and thus the heat generation is continuous. The heat is removed to perform useful work by passing a working medium or coolant such as water in heat exchange relationship with the fuel elements.

As the sustained reaction continues the fissionable atoms are gradually consumed. Some of the fission products produced are neutron absorbers (fission product poisons) which by their capture of neutrons lower the number of neutrons available to cause fission. This decreases the fission reactivity and hence the heat produced.

In a known type of nuclear reactor, for example as used in the Dresden Nuclear Power Station near Chicago, Ill., the reactor core is of the heterogeneous type. That is, the nuclear fuel is in the form of elongated, cladded rods. These fuel rods or elements are grouped together and contained in open-ended tubular flow channels to form separately removable fuel assemblies or bundles. A sufficient number of fuel assemblies are arranged in a matrix, approximately a right circular cylinder, to form the nuclear reactor core capable of the self-sustained fission reaction mentioned hereinbefore. The core is submersed in a fluid, such as light water, which serves both as a coolant and as a neutron moderator. The water which surrounds the core also serves as a neutron reflector. A plurality of control rods, containing neutron absorbing material, are selectively insertable among the fuel assemblies to control the reactivity of the core.

In commonly used nuclear power reactor fuel, fertile materials such as U-238 are included in addition to the above-noted fissionable atoms. For example, a commonly used fuel consists of uranium dioxide ($UO_2$) in which approximately 2 percent of the uranium atoms are U-235 which are fissionable in a thermal neutron flux, while the remaining 98 percent of the uranium atoms are the fertile isotope U-238 which are not significantly fissionable in a thermal neutron flux. In the course of operating the reactor the fissionable atoms (U-235) are gradually consumed and a part of the fertile atoms (U-238) are converted into a fissionable isotope (Pu-239). The concentration of Pu-239 gradually rises and approaches an equilibrium value. Since the Pu-239 atoms are fissionable by thermal neutrons, they contribute to the maintenance of the chain fission reaction.

Normally, in a thermal reactor (a reactor in which most of the fissions are caused by thermal neutrons) the rate of production of fissionable atoms is less than the rate of fissionable atom consumption. Also, some of the fission products produced are neutron absorbers or poisons. Thus the potential reactivity of the fuel charge decreases with exposure and if the design power level is to be maintained, the reactor eventually must be refueled by replacement of some or all of the irradiated fuel.

The spent or irradiated fuel removed from the reactor contains, in addition to a valuable quantity of the original fissionable material, a significant quantity of plutonium including fissionable Pu-239 and Pu-241 and fertile Pu-240. Such spent or irradiated fuel can be reprocessed to separate and recover the uranium and plutonium for reuse. (A process for recovering products of irradiated fuel is disclosed, for example, in U.S. Pat. No. 3,222,124.)

When the cost of the recovered plutonium fuel becomes comparable to the cost of uranium fuel it then becomes desirable for economic reasons to utilize such plutonium fuel in refueling the reactor and/or in initial fueling of a reactor.

It is an object of the invention to utilize plutonium fuel in a nuclear reactor.

The plutonium recovered from spent or irradiated fuel from a thermal reactor is a mixture of several isotopes of plutonium including fissionable Pu-239 and Pu-241, fertile Pu-240, and Pu-242 which in a thermal reactor is a parasite or poison. An isotopic composition of plutonium typical of that recovered from spent uranium fuel from a boiling water reactor is as follows:

| Isotope | Atom Fraction |
|---------|---------------|
| Pu-239  | 0.590         |
| Pu-240  | 0.257         |
| Pu-241  | 0.121         |
| Pu-242  | 0.032         |

The use of plutonium fuel in a reactor designed to use uranium fuel requires consideration of differences in reactor performance because of the differences in the nuclear characteristics of the two fuels. For example, the thermal neutron capture and fission cross sections of the fissile plutonium isotopes, Pu-239 and Pu-241, are greater than those of the fissile uranium isotope U-235. Also, the isotope Pu-240 presents a large capture cross section for neutrons near one electron volt in energy.

The fissile nuclides Pu-239 and Pu-241 have large neutron cross section resonances at about 0.3 electron volts (the upper end of the thermal neutron energy spectrum). The ratio of the probability of a neutron being parasitically captured in Pu-239 and Pu-241 to the probability of neutrons causing fission in Pu-239 and Pu-241 is considerably increased for neutrons with energies near these resonance energies. At thermal neutron energies below the 0.3 electron volt resonance energies, the capture-to-fission ratio decreases. Thus nuclear and economic efficiency is improved by locating plutonium fuel in regions of low thermal neutron energy.

Previously suggested arrangements for utilizing initial inventories of plutonium fuel involve the use of the plutonium fuel in the same fuel assemblies with enriched uranium fuel. This can have several adverse effects such as changing the power coefficient of reactivity and reducing the fraction of delayed neutrons produced per fission and other variables of reactor control requirements and dynamic response. Additionally, economically optimum fuel assembly geometric variables such as fuel rod diameter and spacing, fuel density, moderator content and the like and optimum design performance variables, such as discharge exposure, are different for fuel containing both plutonium and uranium as opposed to fuel fabricated from uranium only.

For example, when fuel assemblies containing a combination of initial plutonium and uranium are distributed uniformly throughout the reactor core, the reactor control requirements are increased by the affect of the plutonium on the power coefficient. This problem can be solved by increasing the water-to-fuel volume ratio. However, if the water-to-fuel ratio is increased through reduction of fuel rod diameter, the heat transfer surface decreases. Thus reduction of the fuel rod diameter usually requires an increase in the number of fuel rods per fuel assembly to maintain the desired rod surface area. Also, a decrease in fuel rod diameter increases the specific power (unit power per unit of fuel) with the result that a larger refueling batch size is required to maintain a fixed refueling interval. Thus fuel cycle economics are penalized. An increase in the number of fuel rods per fuel assembly also increases fuel fabrication costs.

Furthermore when initial plutonium is mixed with U-238 in a fuel assembly, the large thermal neutron absorption cross section of plutonium competes with fertile captures in U-238 thus reducing the conversion ratio (the ratio of fissile atoms produced per fissile atom consumed). The foregoing problems are alleviated, costs are reduced and a net integrated improvement in conversion ratio is achieved by separation of the initial fissile plutonium and uranium fuel. Thus another object of the invention is to utilize initial inventories of fissile uranium and plutonium fuel in separate fuel assemblies.

In a reactor core of finite size, the neutron flux varies both radially across the core and axially through the core because of neutron leakage from the core. For example, the thermal neutron flux decreases radially from the center toward the periphery of the core with a steep upward flux gradient near the periphery due to the action of the reflector. There are also local variations in the neutron density and energy because of the variations in distribution and density of the moderator. For example in the region of the periphery of the core, the low energy neutron population is relatively high because of the presence of the large and relatively cool mass of moderator-reflector surrounding the core. Since the local power density is directly related to the local neutron flux, the power distribution throughout the core also tends to be non-uniform.

The power distribution is important because the power level of operation of the reactor is generally limited by the temperature limits of the materials of the core in the region of the highest power density. Thus when the power distribution is not uniform, only the region which is operating at the highest permissible power density is producing power at its maximum rate with the result that the overall power output is less than is theoretically possible. The practical result of a non-uniform power distribution is the requirement of a larger more expensive core and containment and greater fuel inventory for a given reactor power output.

In general, power reactor operation is based on the concept of an operating cycle. That is, reactor operation is periodically interrupted for refueling to restore the necessary reactivity. From the point of view of fueling or refueling the reactor core, the removable fuel assembly (or bundle of fuel rods) is the basic replaceable subdivision of the nuclear fuel. According to known refueling schemes, only a fraction, for example 20–30 percent, of the fuel assemblies are replaced at each refueling. The particular refueling pattern employed has an important effect on the power distribution throughout the reactor core. When such partial reloading schemes are employed it is evident that the local reactivity of the various fuel assemblies will differ because of the differences in the exposure which they have accumulated. The reactivity distribution affects the neutron flux distribution and hence the power distribution.

Various refueling patterns have been proposed including zone-in-out, zone-out-in, distributed or scatter, and combinations of zone and distributed. In the zone type of refueling pattern the fuel assemblies are distributed in a plurality of concentric zones. In the zone-in-out pattern, the fuel assemblies in the outermost zone are discharged, the remaining fuel assemblies are shifted to the next outer zone and fresh fuel assemblies are loaded into the central zone. This pattern generally aggravates the flux peaking in the central portion of the core.

In the zone-out-in pattern, the fuel assemblies in the central zone are discharged, the assemblies of all other zones are permuted inward, and fresh fuel assemblies are loaded into the peripheral zone. This arrangement tends to flatten the power distribution because the fresh fuel increases the flux in the region of the periphery of the core while the fuel of greatest exposure depresses the flux in the central zone. In both types of zone patterns all of the fuel assemblies are moved at each refueling and there is considerable flux variation and power mismatch from zone to zone.

In the distributed or scatter reloading pattern, fuel assemblies are removed and replaced from locations distributed as uniformly as possible throughout the core whereby the fuel assemblies need not be moved during their lifetime in the core. This arrangement minimizes downtime for refueling and, in a large loosely coupled reactor, can minimize the mismatch among the unequally depleted fuel assemblies. A disadvantage of the distributed refueling pattern is that the fuel in the low neutron flux regions near the periphery of the core accumulates less exposure for a given residence time than the fuel in the more central regions.

Some of the foregoing disadvantages can be overcome by the use of a combined zone-distributed pattern wherein fresh fuel assemblies are loaded into a zone at the periphery of the core, and the partly exposed fuel assemblies from this peripheral zone are moved into a distributed pattern throughout the central portion of the core. This pattern also improves the radial power distribution by its concentration of the high reactivity, fresh fuel in the peripheral zone of the core.

An important disadvantage of both the zone and the zone-distributed loading patterns is that the fuel assemblies reside in the steep local neutron flux gradients near the neutron reflector for a large fraction (for example, 20–30 percent) of their irradiation history.

These steep local gradients in neutron flux skew the exposure distribution within the fuel assemblies and cause increased local power peaking when the fuel is moved into the central portion of the core. The local power distribution from rod-to-rod within a fuel assembly can be flattened by variation of relative fissile or absorber content of the rods (as shown, for example, in U.S. Pat. No. 3,147,191). For example, a lower fissile fuel content can be used in fuel rods which are exposed to a large thermal neutron flux. However, if the fuel assemblies are to be moved between locations having different thermal neutron spectra, the power distribution cannot be tailored effectively in this manner. Furthermore, the fuel experiences a cooler (lower energy) neutron flux spectrum during its residence in the peripheral zone of the core which tends, among other effects, to reduce the conversion of fertile fuel relative to fertile fuel conversion in the central portions of the core.

The peripheral zone of the core is thus a specialized region characterized by: steep local neutron flux gradients caused by leakage of fast neutrons out of the core and a return current of thermal neutrons from the reflector-moderator surrounding the core; a ratio of fast-to-thermal neutron flux which is smaller than in the central region of the core; a cooler (lower energy) thermal neutron spectrum; and a reduced magnitude of neutron flux relative to the central region of the core.

Another object of the invention is to optimize the use of the peripheral zone of a nuclear reactor core.

Another object of the invention is to increase the power density in the peripheral zone of the reactor core.

A further object of the invention is to flatten the power distributions in a nuclear reactor core.

Another object of the invention is to provide plutonium fueled fuel assemblies specifically designed for use in the peripheral zone of a nuclear reactor core.

Another object of the invention is to improve local power distribution in a fuel assembly.

Another object of the invention is to minimize the number of fuel assemblies containing plutonium fuel.

Another object of the invention is to provide an improved refueling pattern.

These and other objects of the invention are achieved by utilizing plutonium fuel in fuel assemblies placed in the peripheral zone of the nuclear reactor core. In this manner these fuel assemblies can be designed to take advantage of the characteristics of plutonium fuel specifically with regard to the characteristics of the peripheral zone. The number of plutonium fueled assemblies in the peripheral zone is a relatively small percentage (for example, in the order of 15 percent) of the total fuel assemblies in the core. Thus the cost of fabricating the radioactive and toxic plutonium fuel is minimized. A distributed fuel reloading pattern can be used in the central and peripheral zones to reduce refueling time and fuel handling damage since none of the fuel assemblies need to be moved during their residence in the fuel core. Local power shaping can be achieved by spatial variation of the fuel from fuel-to-fuel rod across the fuel assemblies. The reduced excess reactivity of plutonium fuel allows greater power density for a given strength of reactivity control. The improvement in power distribution makes possible a reduction in the size of the core, vessel and containment for a given reactor power output.

Further features and advantages of the invention are presented in the following more specific description with reference to the accompanying drawing wherein.

Figure 1:
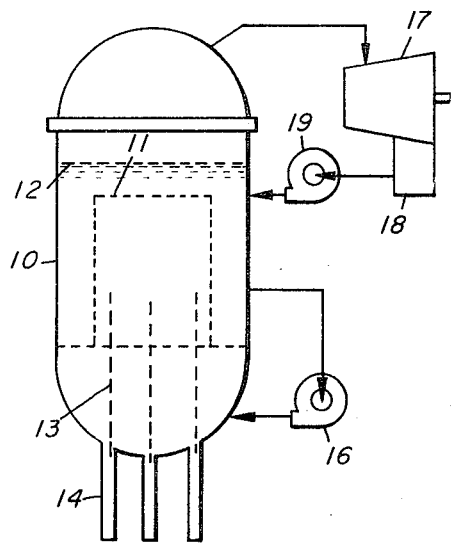
FIG. 1 is a schematic diagram of a typical nuclear reactor power plant.

While not limited thereto, the utilization of plutonium fuel in the peripheral zone of a fuel core in accordance with the invention is described herein in connection with a water cooled and moderated reactor, an example of which is illustrated schematically in FIG. 1. Such a reactor system includes a pressure vessel 10 containing a nuclear chain reactor core 11 submersed in a coolant 12 such as light water. The core 11 includes a plurality of spaced fuel assemblies each of which comprises a plurality of elongated fuel elements or rods positioned in spaced relation within a coolant flow channel. A plurality of control rods 13 (shown in dashed lines) of cruciform shape and containing neutron absorbing material are selectively insertable into the spaces among the fuel assemblies by drive means 14 for mechanical control of the reactivity of the nuclear core. A pump 16 circulates the coolant through the core. The coolant removes heat produced in the fuel elements by the fission process whereby a part of the coolant water is converted to steam. The steam thus produced is utilized by some means such as a turbine 17. The exhaust steam is condensed by a condenser 18 and returned as feedwater to the vessl 10 by a pump 19.

Figure 2:
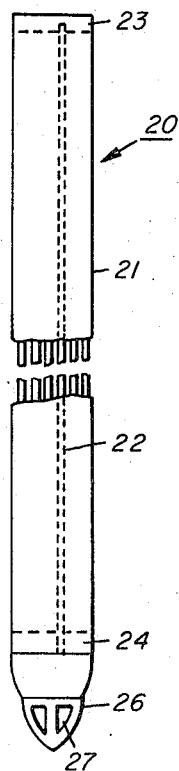
FIG. 2 is an elevation view of a typical fuel assembly.
Figure 3A:
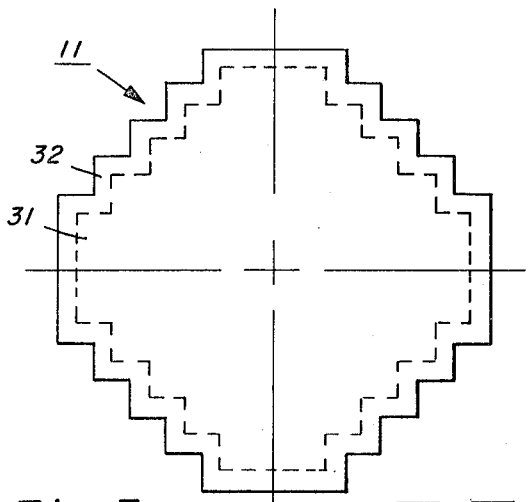
FIG. 3 (parts A and B taken together) is a schematic plan view of a nuclear reactor core as employed in the reactor of FIG. 1.

A fuel assembly 20 is illustrated in elevation view in FIG. 2. The fuel assembly 20 comprises a tubular flow channel 21 of square cross section containing an array of elongated fuel elements or rods 22 supported between upper and lower tie plates 23 and 24. A nose 26 is provided with openings 27 through which the coolant water is received to flow upward past the fuel elements. (A fuel assembly is shown in greater detail by D. A. Venier et al. in U.S. Pat. No. 3,350,275.) The fuel elements 22 may be formed of a tubular cladding containing a plurality of cylindrical pellets of fuel as shown, for example, by J. L. Lass et al. in U.S. Pat. No. 3,365,371. The nuclear core 11 is shown in schematic plan view in FIGS. 3A and 3B. The core 11 is formed by a plurality of fuel assemblies 20 arranged in spaced groups of four surrounding each control rod 13. An interior or central zone 31 is outlined with a dashed line in FIG. 3A while a peripheral zone is indicated as 32.

Figure 3B:
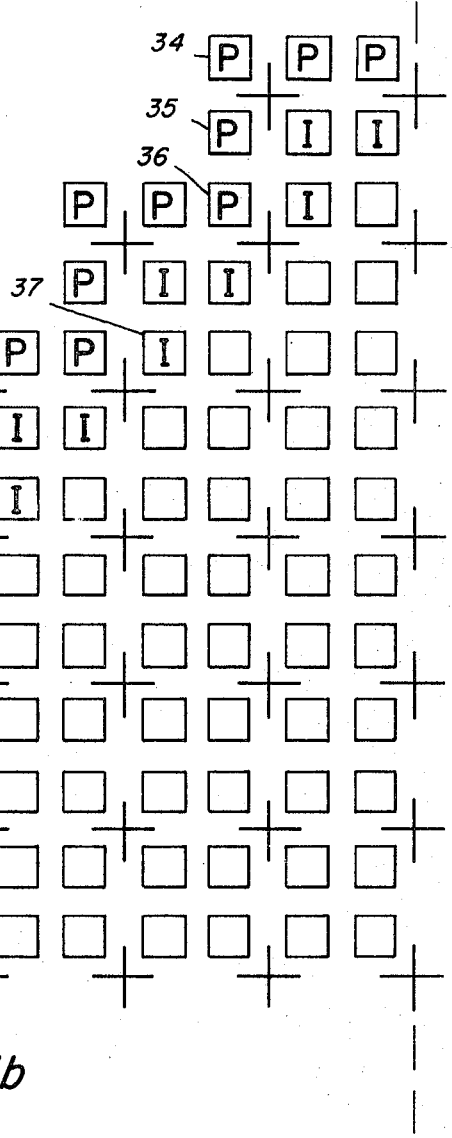

For simplicity only one quadrant or one-quarter of the core 11 is shown in greater detail in FIG. 3B. The peripheral zone 32 of the core includes a plurality of peripheral fuel assemblies 34, 35 and 36 each having an edge and/or one or more sides adjacent the moderator-reflector surrounding the core. Each of the peripheral fuel assemblies is legended P in FIG. 3B. The peripheral zone may also include a plurality of intermediate fuel assemblies 37 (legended I) which, though separated from the edge of the core by the peripheral fuel assemblies, may be substantially within the zone of influence of the edge of the core.

Figure 4:
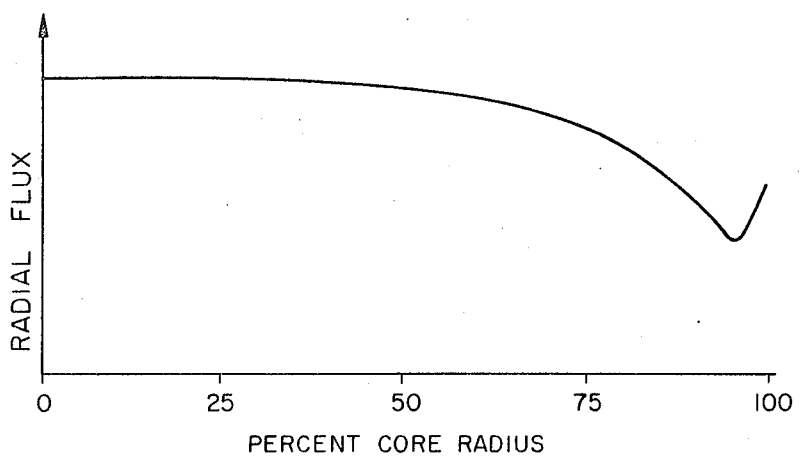
FIG. 4 illustrates the radial, thermal neutron flux distribution of a typically large, reflected power reactor core.

Illustrated in FIG. 4 is a typical radial thermal neutron flux distribution along a radius of a relatively large, reflected power reactor core. The flux curve remains relatively flat over the central portion of the core, drops rapidly toward the periphery because of fast neutron leakage from the core, and increases sharply near the edge of the core due to the return of thermal neutrons from the reflector-moderator surrounding the core.

Figure 5:
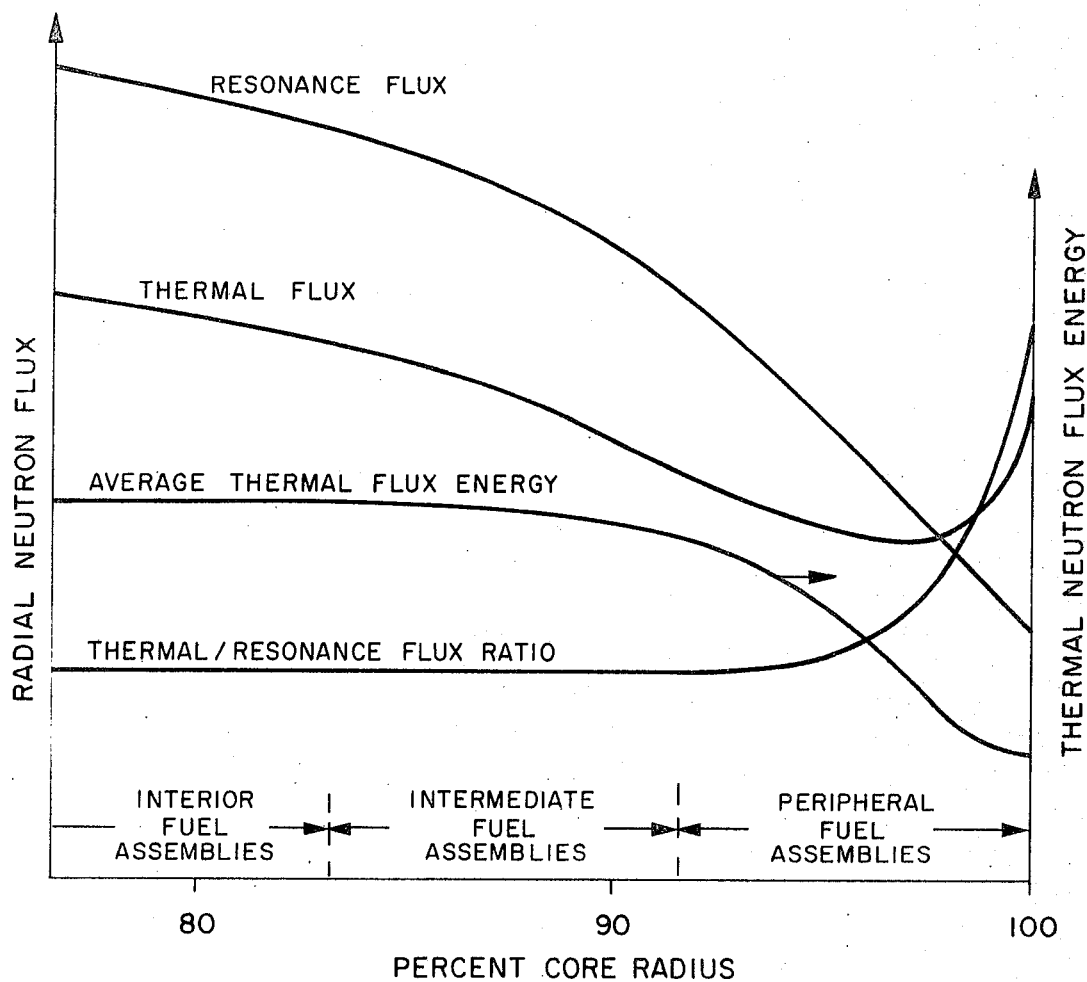
FIG. 5 illustrates typical radial neutron flux characteristics in the peripheral region of the core.

The characteristics of the peripheral zone of the core are more completely shown by FIG. 5 which illustrates typical radial distributions of resonance (epi-thermal) neutron flux, thermal neutron flux, and the ratio of the thermal-to-resonance neutron flux in the peripheral region of the core. Also illustrated in FIG. 5 is a typical radial distribution of the energy of the thermal neutron flux or thermal neutron spectrum in the peripheral zone. By "typical" is meant that the flux distributions in the peripheral zone illustrated in FIG. 5 are those which obtain in a reflected, non-flux-flattened core fueled with uniform or similar fuel assemblies or reloaded in an evenly distributed or scatter reloading pattern as shown, for example, by M. M. El-Wakil in FIGS. 5-11 of Nuclear Power Engineering, McGraw-Hill Book Company, 1962. (by "typical" is meant that these are the flux distributions which obtain in a uniformly fueled core.)

FIG. 5 thus illustrates that, as compared to the interior fuel assemblies, the peripheral fuel assemblies, and to a lesser extent the intermediate fuel assemblies, are subjected to a reduced magnitude of neutron flux, steep local neutron flux gradients, an increased ratio of thermal-to-resonance flux, and to a cooler (lower energy) thermal neutron flux spectrum.

In accordance with the present invention the purposes of using plutonium fuel in a nuclear reactor and of optimizing the use of the peripheral zone of the core are both served by providing plutonium fueled fuel assemblies especially designed for use in the peripheral zone.

Figure 6:
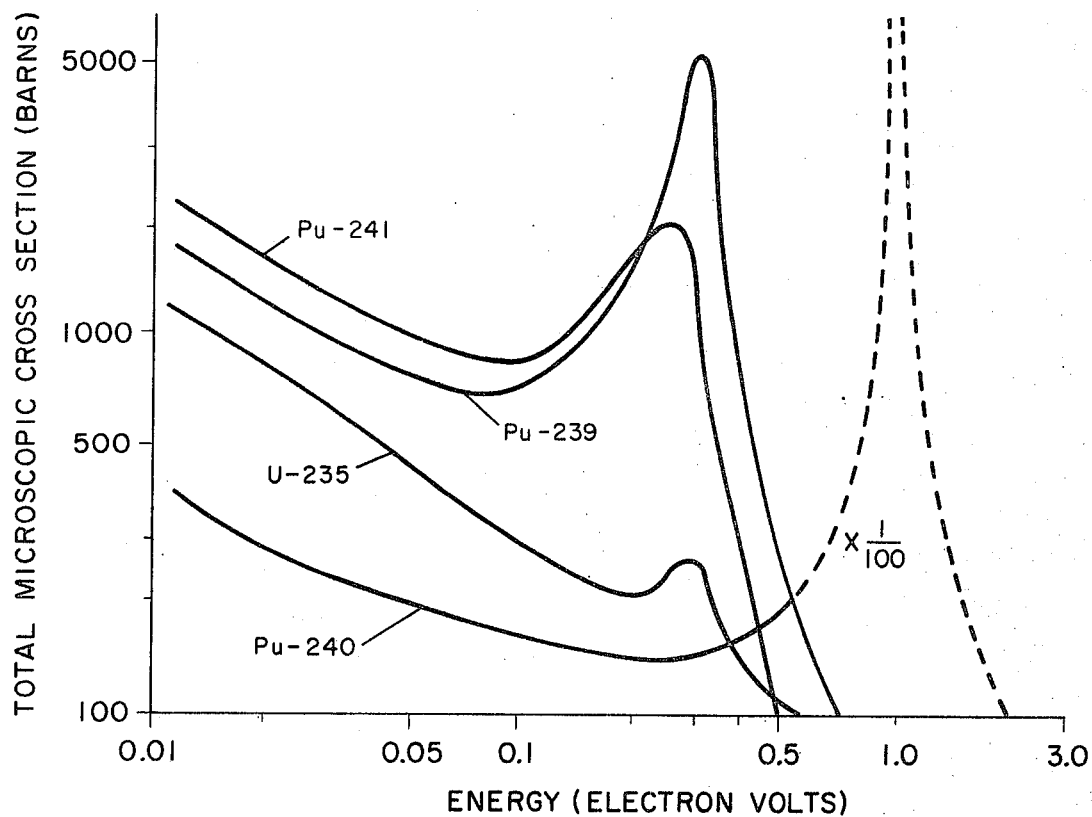
FIG. 6 illustrates the energy dependent microscopic cross sections of uranium and plutonium fuels.

The properties of the plutonium fuel which are used to advantage in the peripheral region of the core are discussed hereinafter with reference to FIG. 6 which illustrates the variation in microscopic cross sections of U-235 and of the isotopes of plutonium of interest over thermal and resonant energy ranges.

The capture-to-fission ratio of the fissile plutonium nuclides, Pu-239 and Pu-241, decreases as the neutron energy decreases. This trend is caused by the large low energy Pu-239 and Pu-241 cross section resonances near 0.3 electron volts which have large capture-to-fission ratios. For a thermal reactor this property thus favors location of the plutonium fuel in the low energy thermal neutron spectrum of the peripheral zone of the core.

The mean fission cross section of plutonium in a thermal neutron flux is about 2.7 times greater than that of uranium. Since the power generation rate is directly proportional to the fission cross section times the neutron flux, the greater fission cross section of plutonium is an aid in increasing the relative power in the peripheral zone to thereby improve the radial power distribution of the core. The resulting more rapid burnup of the plutonium fuel also aids in matching the refueling cycle periods of the peripheral and central zones.

The plutonium isotope Pu-240, which is present in plutonium produced in a thermal reactor, has a very large resonance absorption cross section at 1.0 electron volt. Neutron captures in the fertile Pu-240 produce fissile Pu-241. However, captures in Pu-240 reduce reactivity and, hence, increase the plutonium fuel inventory requirements. The plutonium fuel inventory requirements are reduced by placing the plutonium fuel in the low energy neutron spectrum of the peripheral zone whereby neutron capture in Pu-240 is reduced.

Because of the presence of the fertile Pu-240 and its relatively high conversion rate, plutonium fuel changes less in reactivity per unit of exposure than does uranium fuel. In a large loosely coupled reactor, the power distribution is strongly affected by the local infinite multiplication. This plutonium fuel in the peripheral zone aids in maintaining a flattened radial power distribution toward the end of the fuel cycle.

Because plutonium can be chemically separated from uranium, variations in plutonium concentration can simply be achieved by blending. This makes it economically feasible to provide the several variations in plutonium content needed to minimize local power peaking in the steep neutron flux gradients of the peripheral zone.

Further advantages to the use of plutonium fuel in a separate peripheral zone of the core include the following. Plutonium fuel is radioactive and biologically toxic; thus it is difficult and expensive to handle. The cost of plutonium fuel fabrication is minimized by concentrating it in a relatively small number of the fuel assemblies of the core.

Figure 7:
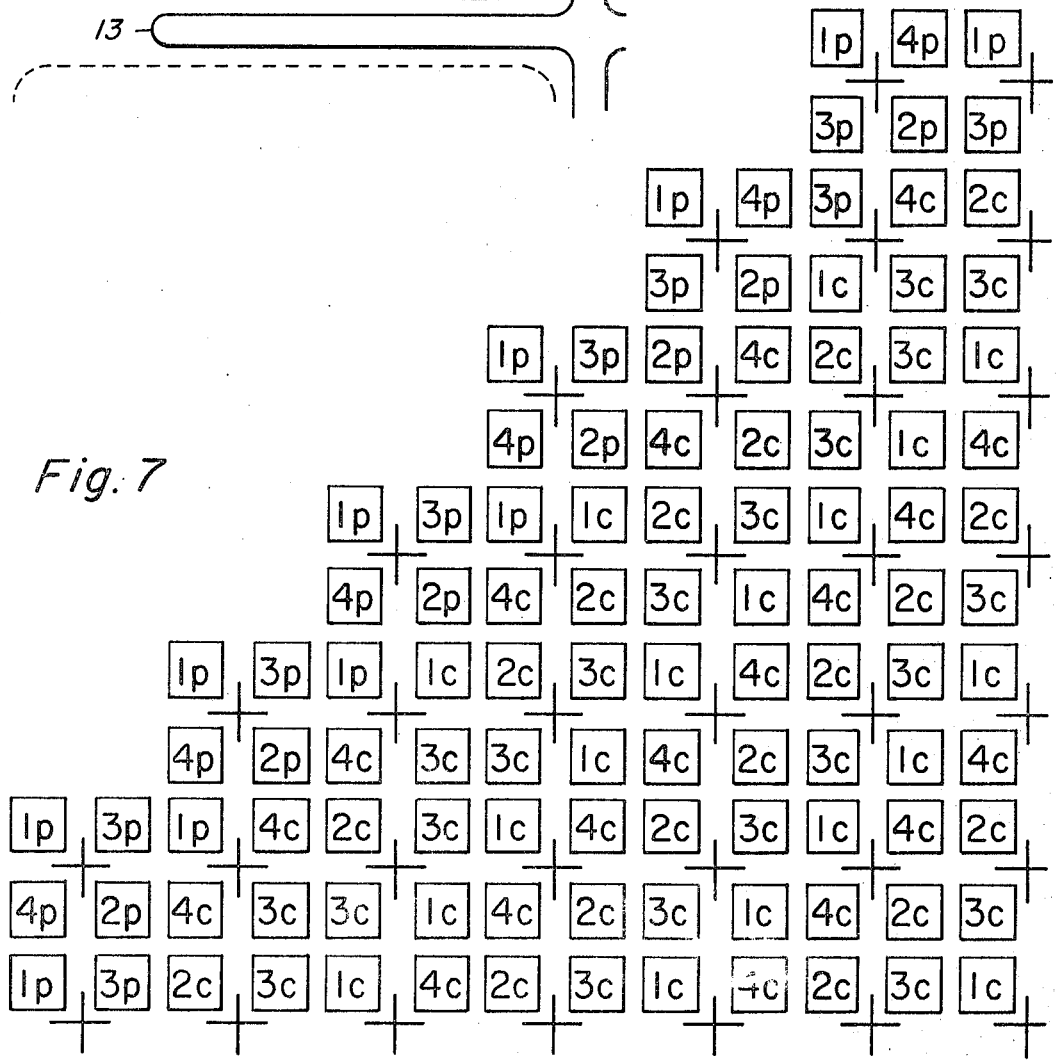
FIG. 7 is a plan view of a portion of a core illustrating an improved refueling pattern.

The use of plutonium fuel in the fuel assemblies of the peripheral zone makes feasible an improved refueling pattern. Though not a limitation of the invention, it is contemplated that separate distributed or scatter refueling patterns will be used for both the plutonium fueled peripheral zone and the uranium fueled central zone. Thus none of the fuel assemblies are moved during their residence in the core with the result that refueling time and handling damage are minimized. A quadrant of a fuel core is shown in FIG. 7 illustrating such a refueling scheme. The scheme is based upon an approximately 25 percent batch reload, that is, each fuel assembly resides in the core through four cycles of operation. The fuel assemblies of the peripheral zone are marked "P" while the fuel assemblies of the central zone are marked "C." The numbers indicate the number of cycles the fuel assembly has been in the core. The fuel assemblies marked "4" are the next to be replaced and so forth. For this refueling scheme the enrichment of the fuel in the peripheral zone is selected to provide a specific power (kw/kg) level approximately equal to the specific power level in the central zone so that the core residence time is the same for both the peripheral zone and central zone fuel assemblies. However, it is possible to design the peripheral fuel for lower specific power and either discharge the peripheral fuel at a lower exposure or with a longer residence time in the core.

The use of plutonium fuel in special fuel assemblies for use only in the peripheral zone of the core, and which do not require movement during their residence in the core, allows independent optimization of the design parameters such as fuel mixture, fuel enrichment, fuel exposure, fuel rod diameter, temperature coefficient of reactivity, water-to-fuel ratio whereby the nuclear, thermal, hydraulic and economic performance of the peripheral zone may be optimized. The use of plutonium fuel only in the fuel assemblies of the peripheral zone also allows the design of the uranium fueled fuel assemblies of the central zone to be independently optimized.

Examples of specific designs of fuel assemblies for use in the peripheral zone of the core are hereinafter described with reference to FIGS. 8, 9 and 10 which are schematic plan views of peripheral fuel assemblies illustrating the spatial distribution of plutonium fuel in the different types of peripheral assemblies.

As is evident in FIG. 3B, the peripheral fuel assemblies P have three different geometries with respect to the water moderator-reflector surrounding the core. The assemblies 34 have two sides and the included corner facing the reflector. The assemblies 35 have one side facing the reflector, and the assemblies 36 have one corner facing the reflector. These differences result in different neutron flux distributions across these assemblies. Therefore different spatial distributions of the plutonium fuel in these assemblies are required for optimum results.

Figure 8:
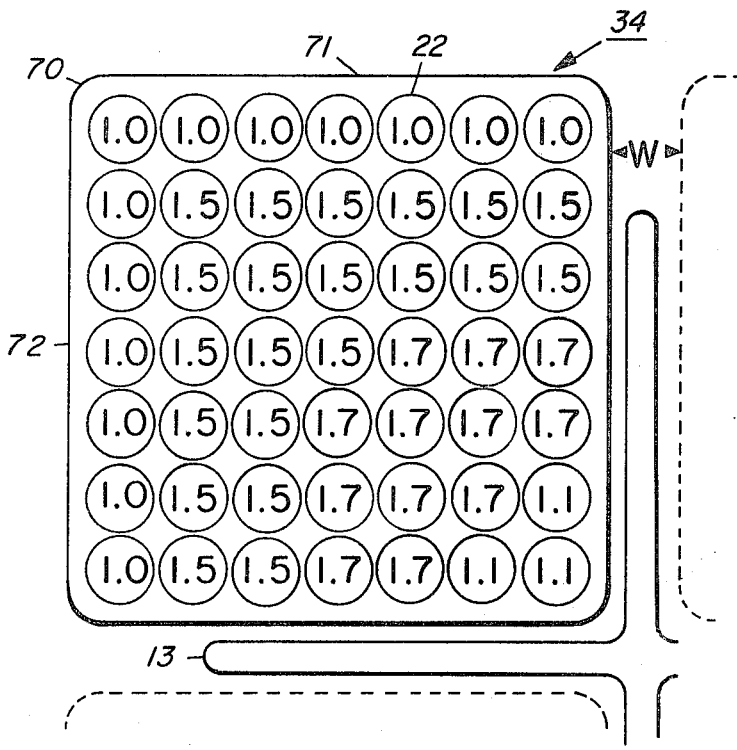
FIGS. 8, 9 and 10 are schematic plan views of peripheral fuel assemblies illustrating the spatial distribution of plutonium fuel therein.

FIG. 8 illustrates an example of the spatial distribution of the plutonium fuel in the peripheral fuel assemblies 34. As illustrated, the assemblies comprise a 7 × 7 array of fuel rods 22 in a tubular flow channel. A corner 70 and two sides 71 and 72 face the reflector surrounding the core. The number marking each of the rods indicates the atom percentage of fissile plutonium fuel contained in the rod. (The plutonium fuel advantageously can be mixed with, for example, depleted or natural uranium.) The plutonium content of the fuel rods is graduated diagonally across the fuel assembly from 1 atom percent in the fuel rods adjacent the sides 71 and 72 to a maximum of 1.7 atom percent, to 1.1 atom percent in the fuel rods immediately adjacent the interior corner. A comparison of this plutonium fuel distribution with the thermal flux distribution across the peripheral fuel assemblies, as shown in FIG. 5, shows that the plutonium fuel distribution is arranged to be approximately inversely proportional to the thermal flux distribution. That is, local power flattening is achieved by placing the fuel of highest enrichment in the positions of minimum thermal neutron flux and vice versa.

Figure 9:
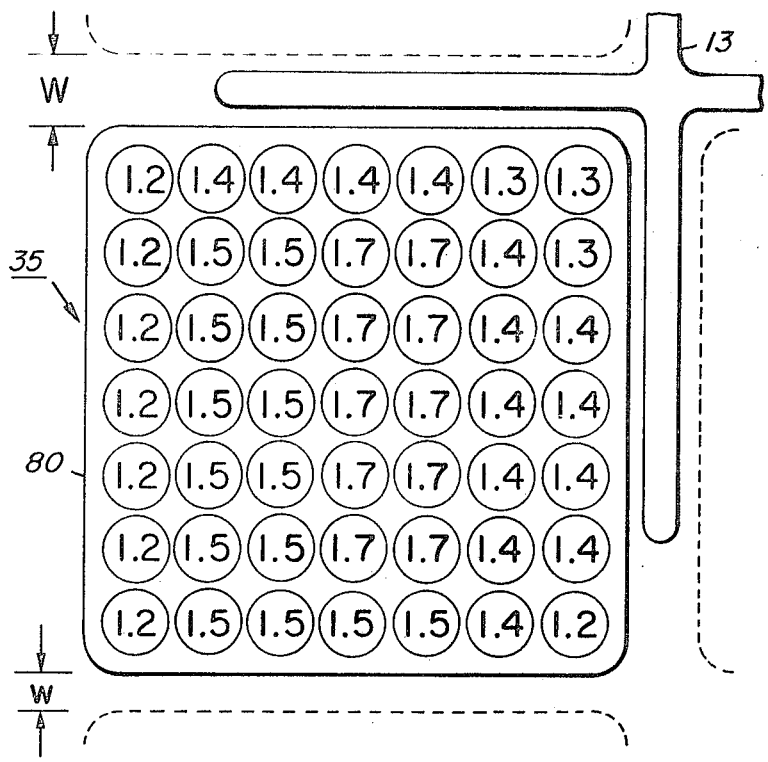
Figure 10:
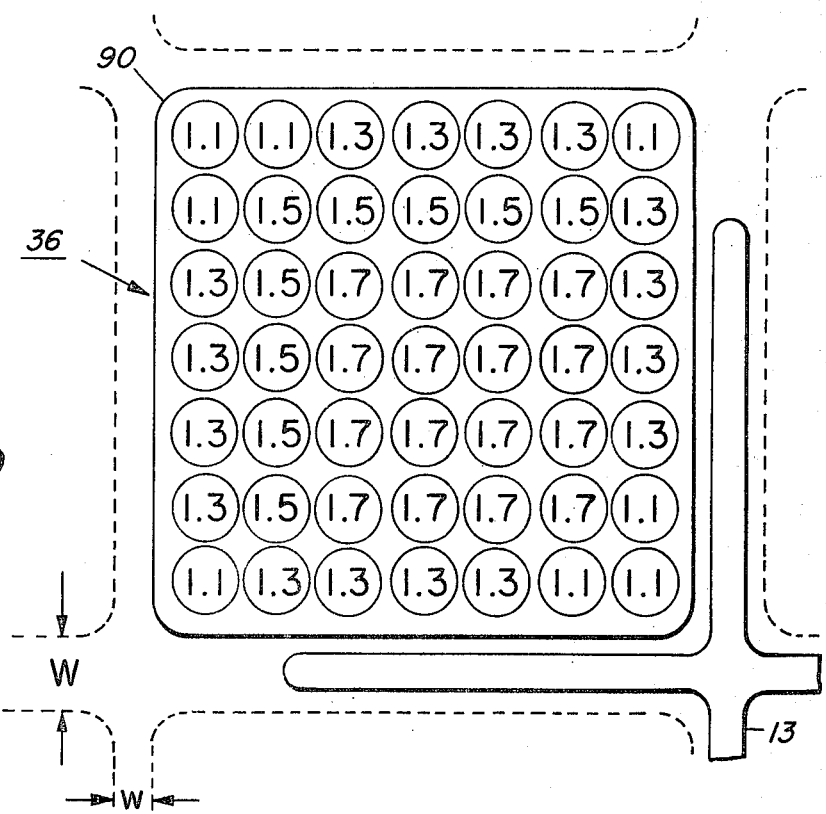

FIGS. 9 and 10 similarly illustrate examples of the plutonium fuel distribution in peripheral fuel assemblies 35 and 36, respectively. In FIG. 9, a side 80 of the assembly 35 faces the reflector and the plutonium fuel enrichment is graduated from this side to the opposite or interior side. In FIG. 10, a corner 90 of the assembly 36 faces the reflector and the plutonium fuel enrichment is varied diagonally across the assembly from this corner.

The plutonium fuel distribution in the intermediate fuel assemblies I is not specifically illustrated herein because the appropriate enrichment variation is believed readily deducible from FIG. 5 in view of the foregoing discussion of the enrichment variation in the peripheral fuel assemblies. Furthermore, to minimize fabrication costs a uniform distribution of plutonium fuel in the fuel rods of the intermediate fuel assemblies 37 usually provides acceptable results. The average plutonium enrichment in the intermediate assemblies is lower than the average plutonium enrichment of the peripheral assemblies because, as shown in FIG. 5, the average thermal neutron flux to which the intermediate assemblies are exposed is higher. For example, the average fissile plutonium content of the intermediate assemblies may be about 1.2 atom percent as compared to the average fissile plutonium content of about 1.37 atom percent in the peripheral assemblies.

In the foregoing, examples of fuel assemblies with spatially varied fissile plutonium fuel content for matching the neutron flux gradients of the peripheral zone have been described. A similar result can be achieved by using a uniform distribution of fissile plutonium fuel and by appropriate spatial variation of the content of other nuclear materials such as U-235, Pu-240, U-239, U-233 and Th-232. However, the chemical separability of plutonium favors the use of varying plutonium content.

Reactor control, as provided by movable control rods and other neutron absorbing arrangements such as soluble and burnable poisons, is an important consideration in the design of a reactor core because it is necessary to be able to shut down the core under all conditions. To maintain the desired high specific power in the peripheral zone of the core, it is necessary to provide both a fuel with a large fission cross section (such as plutonium fuel) and a high neutron flux level. The neutron flux level in the peripheral zone is a function of both the neutron leakage from the central zone and the local excess multiplication of the fuel of the peripheral zone. As is well-known, most thermal reactors are designed so that the neutron multiplication is greater in the cold condition than in the hot condition. Thus the cold shutdown condition requires the maximum control. The design of peripheral zone fuel assemblies for high specific power in the peripheral zone may be lead to control problems in this zone. There are several approaches to the solution of this possible problem including the following.

Control rods of greater control strength may be used in the peripheral zone. However, this may result in excess control rod worth whereby control may be marginal in the case that one of the control rods becomes inoperative.

A control poison which is soluble in the coolant may be used for reactor control. Soluble poison may be restricted to use for hot-to-cold shutdown only, or in some reactor systems it also may be used for control at power. In both cases, soluble poison can provide adequate control to permit design for equal specific power in the peripheral and central zones.

The thickness of the peripheral zone can be made small enough (for example, only the peripheral fuel assemblies) so that the neutron flux is more a function of the leakage from the central zone and less a function of the local excess multiplication of the peripheral zone fuel. The reduced excess reactivity of plutonium fuel contributes to the feasibility of this design. Because of the large capture cross section of the fertile Pu-240, it is possible to provide a large fissile plutonium content and yet maintain a relatively small excess reactivity.

Since the fuel assemblies of the peripheral zone are specially designed, moderator-to-fuel ratio can be selected such that the local reactivity decreases, rather than increases, from the hot to cold condition. This can be accomplished in several ways including variations in the size, number and spacing of the fuel rods and by introducing special moderator channels in the fuel assemblies. Increasing the widths of the water gaps W and w (FIGS. 8, 9 and 10) between the peripheral and central zones can also aid in reducing the cold control requirements of the peripheral zone.

Thus what has been described is a nuclear reactor core utilizing plutonium fuel in fuel assemblies for use in the peripheral zone of the core to optimize the utilization of plutonium and the use of the peripheral portion of the core.

While illustrative embodiments of the invention are described herein, modifications and adaptations thereof may be made by those skilled in the art without departure from the spirit and scope of the invention as defined by the following claims.

What is claimed is:

1. A method of fueling and refueling a thermal nuclear reactor having a fuel core comprising an array of fuel assemblies radially surrounded by a moderator-reflector water layer wherein said core includes a first region including the ones of said fuel assemblies having at least one edge adjacent said water layer and a second region including all of the fuel assemblies of said core except the fuel assemblies in said first region, comprising the steps of: placing a first fuel enriched with fissile uranium and initially free of plutonium in the fuel assemblies in said second region of said core, and placing a second fuel including initial fissile plutonium in the fuel assemblies in said first region of said core.

2. The method of claim 1 wherein said core includes a third region of fuel assemblies between said first and second regions and including the further step of: placing a fuel including fissile plutonium in the fuel assemblies in said third region of said core.

3. The method of claim 1 including the further steps of: determining a reflected unflattened radial thermal neutron flux distribution across said first region of said core, and varying the initial enrichment of said second fuel substantially in inverse proportion to said radial flux distribution across said first region.

4. A method of fueling and refueling a thermal nuclear reactor having a fuel core comprising an array of fuel assemblies radially surrounded by a moderator-reflector including a first group of said fuel assemblies located in a central region of said core and a second group of said fuel assemblies located in a peripheral region of said core, comprising the steps of: determining a reflected unflattened radial thermal neutron flux distribution across said peripheral region of said core, placing a first fuel enriched with fissile uranium and initially free of plutonium in fuel assemblies of said first group; placing a second fuel including initial fissile plutonium in fuel assemblies of said second group; and varying the initial enrichment of said second fuel substantially in inverse proportion to said radial flux distribution in said peripheral region.

5. The method of claim 4 wherein said core includes a third group of fuel assemblies located in an intermediate region between said central and peripheral regions including the further steps of: placing a third initial fuel including initial fissile plutonium in fuel assemblies of said third group; and varying the initial enrichment of said third fuel in inverse proportion to said radial flux distribution in said intermediate region.

6. A thermal nuclear reactor having a fuel core comprising an array of spaced fuel assemblies radially surrounded by a moderator-reflector, the combination of: a first region of said core including the ones of said fuel assemblies having at least one edge adjacent said moderator-reflector, a second region of said core including all of the fuel assemblies of said core except said fuel assemblies in said first region, a first fuel enriched with fissile uranium and initially free of plutonium in the fuel assemblies of said second region of said core, and a second fuel including initial fissile plutonium in said first region of said core.

7. The fuel core of claim 6 wherein said core includes a third region of fuel assemblies between said first and second regions and wherein the fuel assemblies in said third region contain initial fissile plutonium.

8. The fuel core of claim 6 wherein the initial enrichment of said second fuel is graduated across said first region substantially in inverse proportion to a reflected unflattened radial thermal neutron flux distribution across said first region of said core.

9. A water-cooled thermal nuclear reactor having a fuel core comprising an array of fuel assemblies radially surrounded by a layer of water for moderating neutrons and for reflecting neutrons to said core, the combination of: a first fuel enriched with fissile uranium and free of initial plutonium in the fuel assemblies in a central region of said core, and a second fuel including initial fissile plutonium in the fuel assemblies in a peripheral region of said core adjacent said water layer.

10. The fuel core of claim 9 wherein the initial enrichment of said second fuel is graduated across said peripheral region substantially in inverse proportion to a reflected unflattened radial thermal neutron flux distribution across said peripheral region of said core.

11. The fuel core of claim 9 further including a third fuel including fissile plutonium in the fuel assemblies of an intermediate region of said core between said peripheral and central regions.

12. The fuel core of claim 11 wherein the initial enrichments of said second and third fuels are graduated across said peripheral and intermediate regions, respectively, substantially in inverse proportion to a reflected unflattened radial thermal neutron flux distribution across said peripheral and intermediate regions, respectively.

* * * * *